March 28, 1967  J. R. HALTER  3,311,357

SKID PIPE FOR USE IN FURNACES

Filed Nov. 16, 1964

INVENTOR.
Joseph Richard Halter
BY
Frease, Bishop, Johns & Schick
ATTORNEYS

United States Patent Office 3,311,357
Patented Mar. 28, 1967

3,311,357
SKID PIPE FOR USE IN FURNACES
Joseph Richard Halter, Canton, Ohio, assignor to The Canton Drop Forging & Manufacturing Company, Canton, Ohio, a corporation of Ohio
Filed Nov. 16, 1964, Ser. No. 411,290
1 Claim. (Cl. 263—6)

The invention relates to skid pipes for use in furnaces for heating slabs and the like, and to the manufacture of such skid pipes.

It is common practice to provide furnaces for heating metal slabs and the like with a plurality of parallel, longitudinally disposed skid pipes, upon which the slabs or similar articles are slidably moved through the furnace. Such skid pipes are usually formed of lengths of cast or welded pipe, or seamless tube, of low carbon steel with an approximately one inch round, low carbon bar welded to one side thereof, forming a rib for the slabs to slide upon.

Two or more of these skid pipes are located in parallel relation longitudinally through the furnace with the round bars disposed upwardly and forming tracks upon which slabs, or similar articles, disposed transversely of the skid pipes, may be slidably moved thereon through the furnace.

Cooling fluid, such as water, is continuously passed through these skid pipes to prevent their becoming too hot during the operation of the furnace for heating steel slabs and the like.

In actual use difficulty has been experienced with these skid pipes. Due to the difference in the cross-sectional areas of the pipes per se and of the round bars welded thereon, there is a differential in expansion and contraction of the pipe and the round bar welded thereon.

This frequently results in breaking or rupture of the weld joint between the bar and the pipe, causing the bar to bend and distort, jamming the slabs on the furnace. In some instances the entire weld may break so that the round bar becomes entirely broken away from the pipe. If such a pipe is used for any length of time, the slabs being slidably moved upon the same will eventually wear right through the pipe, causing a water leak which could cause an explosion in the furnace.

The result is that it is necessary to shut down the furnace and unload the slabs therefrom so that the damaged skid pipe or pipes may be removed and replaced. As a consequence, both the shut-down time and the repairs add to the cost of operation of the furnace and processing of the slabs.

In order to overcome the above disadvantages and difficulties, applicant has produced the skid pipe comprising the present invention, in which a longitudinally disposed rib, for the slabs to slide upon, is formed integrally upon the exterior of the pipe.

Applicant has found that the most desirable manner of constructing such a skid pipe is by extruding the same by the hot extrusion of low carbon steel (.10–.15 carbon), in conventional manner, through a die of suitable shape to produce a longitudinally disposed integral rib upon the exterior of the pipe.

It is, therefore, a primary object of the invention to produce a skid pipe for the above stated use which overcomes the difficulties and disadvantages of the prior art.

Another object of the invention is to provide a skid pipe formed of low carbon steel having an integral longitudinally disposed rib upon the exterior thereof.

A further object of the invention is to provide a skid pipe of the character referred to which is formed by extrusion.

The above objects together with others which will be apparent from the drawing and following description, or which may be later referred to, may be attained by constructing the improved skid pipe in the manner hereinafter described in detail and illustrated in the accompanying drawing, in which.

Figure 2:
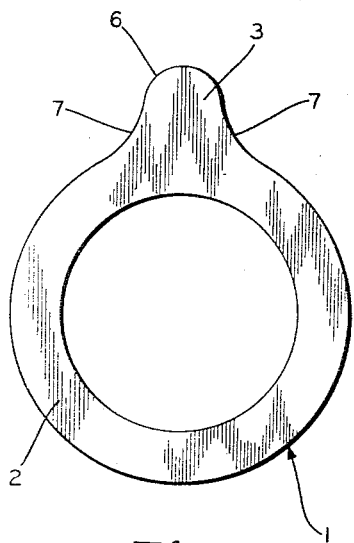
FIG. 2 is an end view of the skid pipe shown in FIG. 1.

Referring now more particularly to the embodiment of the invention illustrated in the drawing, a skid pipe embodying the invention is indicated generally at 1. As best shown in FIG. 2, this skid pipe has a circular wall 2 of considerable thickness and an integral, longitudinally disposed rib 3 formed upon the exterior thereof and extending the full length of the pipe.

Figure 1:
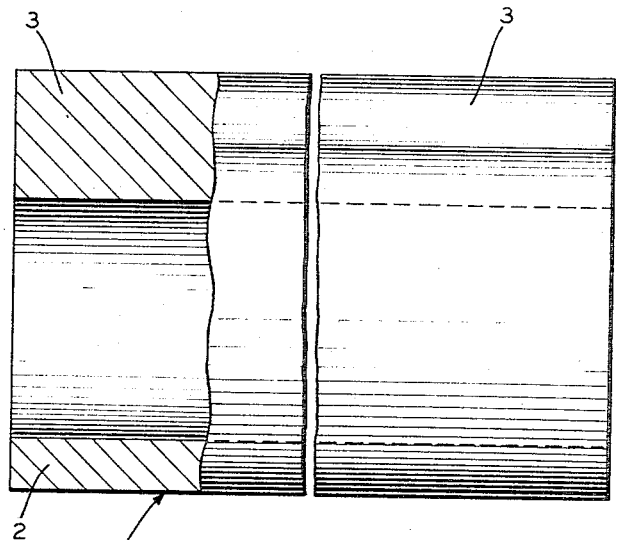
FIG. 1 is a side elevation, with parts broken in section, of end portions of a skid pipe embodying the invention.
Figure 3:
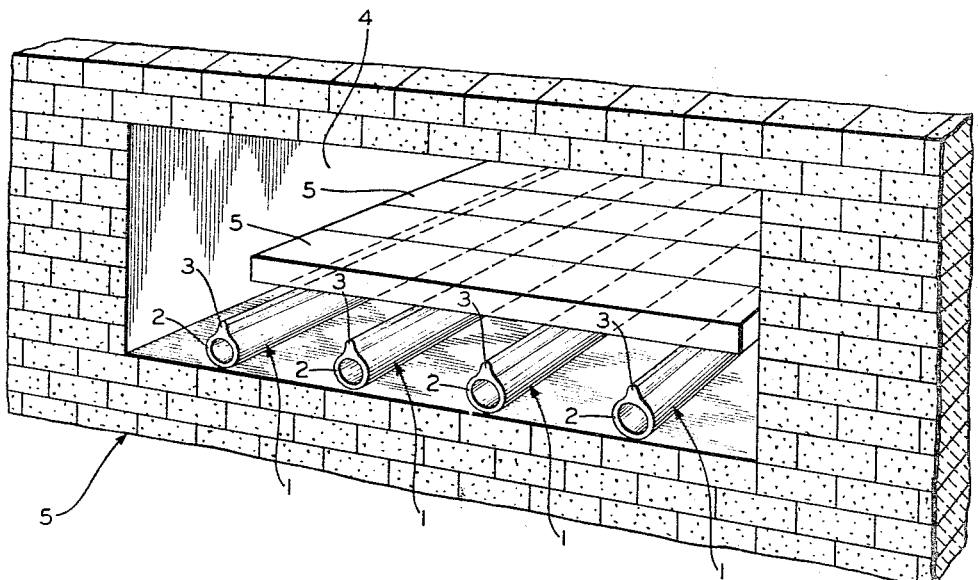
FIG. 3 is a perspective view showing a plurality of the improved skid pipes mounted in a slab-heating furnace.

As shown in FIG. 3, a plurality of the skid pipes 1 are placed within the heating chamber 4 of a slab-heating furnace indicated generally at 5. The pipes 1 are located parallel to each other and may be equally spaced apart as shown, the ribs 3 of the pipes being disposed upwardly in the manner shown in FIG. 1, so that slabs or the like, as indicated at 5, may be located transversely across the several skid pipes and slidably moved longitudinally upon the ribs 3 thereof by any usual and conventional material-moving devices, such as ordinarily used for slidably conveying slabs or the like upon skid pipes in a furnace to heat the same.

The pipes 1 may have water, or other suitable cooling fluid, passed therethrough as is conventional in skid pipes. Since this connection of cooling fluid to the pipes is common and forms no part of the present invention, it is not thought necessary to illustrate the same.

The improved skid pipe is preferably formed of low carbon steel (.10–.15 carbon). The pipe is of rugged construction. As an example of a typical skid pipe made under the present invention, the pipe may have an outside diameter of 4", a wall thickness of slightly over ½", and the integral rib 3 may extend about ⅞" beyond the continuation of the outside diameter of the pipe.

The rib may be rounded, as indicated at 6, on a radius of about ⁷⁄₁₆" and merges on each side with the wall 2 of the pipe through a radius indicated at 7, of about 1". The improved skid pipe is preferably formed by hot extruding the same from low carbon steel of approximately the above carbon content.

Ordinarily, there may be a variation in the thickness of the wall 2 of ±12.5%. The straightness of the pipe should be within .051 per foot. The twist should be within 1° per foot, the maximum 5° total from vertical center line.

The surface condition of the pipe is to be as extruded, with surface defects not to exceed ¹⁄₃₂" maximum. The extruded pipe of the above specifications has a cross-sectional area of about 6.81 square inches and a weight of approximately 23.16 pounds per foot net.

With this consrtuction it will be seen that slabs or the like, as indicated at 5, may be continually slidably moved along the integral ribs 3 of the skid pipes without danger of breaking the ribs from the pipe, as frequently happens with conventional skid pipes which have the ribs welded thereto in the form of round bars.

Thus, there is no danger of a rib becoming broken and bent or distorted so as to cause slabs to jam within the furnace, necessitating shut down of the furnace and unloading of the slabs therefrom in order to remove and replace the damaged skid pipe or pipes.

Nor is there danger of the ribs becoming entirely broken away from the pipes so that the continued sliding of slabs thereover will wear entirely through the walls of the pipes, causing a water leak which may result in an explosion.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claim.

I claim:

A skid pipe for slab-heating furnaces, comprising a substantially straight extruded .10 to .15 carbon steel pipe of substantially circular cross section, and a longitudinally disposed integral rib upon the exterior of the pipe and coextensive therewith, said rib having a substantially semicircular outer edge and increasing in thickness toward the circumference of the pipe.

References Cited by the Examiner
UNITED STATES PATENTS

| | | | |
|---|---|---|---|
| 2,563,883 | 8/1951 | Strickland | 263—6 |
| 2,749,107 | 6/1956 | Corriston | 263—6 |

FOREIGN PATENTS

| | | |
|---|---|---|
| 1,074,041 | 3/1954 | France. |

OTHER REFERENCES

Page 291 of Trinks' Industrial Furnaces, vol. 1, 3rd edition, copyright 1934. Published by John Wiley and Sons, New York, N.Y.

FREDERICK L. MATTESON, Jr., *Primary Examiner.*

JOHN J. CAMBY, *Examiner.*